(12) United States Patent
Krämer et al.

(10) Patent No.: US 7,637,200 B2
(45) Date of Patent: Dec. 29, 2009

(54) PNEUMATIC BRAKE BOOSTER

(75) Inventors: Horst Krämer, Ginsheim-Gustavsburg (DE); Thomas Sellinger, Offenbach (DE)

(73) Assignee: Contential Teves AG & Co. oHG, Frankfurt (DE)

( * ) Notice: Subject to any disclaimer, the term of this patent is extended or adjusted under 35 U.S.C. 154(b) by 274 days.

(21) Appl. No.: 11/665,307

(22) PCT Filed: Oct. 7, 2005

(86) PCT No.: PCT/EP2005/055084

§ 371 (c)(1),
(2), (4) Date: Apr. 12, 2007

(87) PCT Pub. No.: WO2006/042794

PCT Pub. Date: Apr. 27, 2006

(65) Prior Publication Data

US 2007/0261545 A1 Nov. 15, 2007

(30) Foreign Application Priority Data

Oct. 15, 2004 (DE) .................. 10 2004 050 582
Oct. 4, 2005 (DE) .................. 10 2005 047 529

(51) Int. Cl.
  *B60T 13/575* (2006.01)
  *B60T 13/563* (2006.01)
(52) U.S. Cl. .................................... 91/369.2
(58) Field of Classification Search ........... 91/369.2, 91/369.3, 376 R
See application file for complete search history.

(56) References Cited

U.S. PATENT DOCUMENTS

| 4,494,443 | A |   | 1/1985 | Tsubouchi |
| 4,632,014 | A | * | 12/1986 | Endo ......................... 91/369.2 |
| 4,784,038 | A | * | 11/1988 | Gautier ...................... 91/369.2 |
| 4,892,027 | A | * | 1/1990 | Wagner et al. ............. 91/369.2 |
| 5,452,644 | A | * | 9/1995 | Bauer et al. ................ 91/376 R |
| 5,546,846 | A | * | 8/1996 | Bauer ......................... 91/376 R |
| 6,467,390 | B1 | * | 10/2002 | Harth et al. ................. 91/369.2 |
| 7,032,496 | B2 | * | 4/2006 | Schramm et al. ........... 91/369.2 |

FOREIGN PATENT DOCUMENTS

| DE | 39 04 641 A1 | 8/1990 |
| DE | 42 08 384 A1 | 9/1993 |

* cited by examiner

Primary Examiner—Thomas E Lazo
(74) Attorney, Agent, or Firm—RatnerPrestia

(57) ABSTRACT

A pneumatic brake booster includes a booster housing, subdivided into at least two chambers by at least one axially movable wall to which a pneumatic differential pressure can be applied, a control valve controlling the differential pressure and being arranged in a control housing, an operable input member, connected to a valve piston, an output member which applies a boosting force to a master cylinder, as well as an accommodating element, which accommodates a rubber-elastic reaction element and the output member abutting thereon in a radial direction, with the accommodating element being axially and radially supported on the control housing and being held in an axial direction by means of a holding element.

10 Claims, 3 Drawing Sheets

PNEUMATIC BRAKE BOOSTER

RELATED APPLICATIONS

This application is the U.S. national phase application of PCT International Application No. PCT/EP2005/055084, filed Oct. 7, 2005, which claims priority to German Patent Application No. DE102004050582.9, filed Oct. 15, 2004 and German Patent Application No. DE102005047529.9, filed Oct. 4, 2005, the contents of such applications being incorporated by reference herein.

BACKGROUND OF THE INVENTION

The present invention relates to a pneumatic brake booster comprising a booster housing, which in an exemplary embodiment is subdivided into at least two chambers by at least one axially movable wall to which a pneumatic differential pressure can be applied, a control valve controlling the differential pressure and being arranged in a control housing, an operable input member, which is connected to a valve piston, an output member which applies a boosting force to a master cylinder, as well as an accommodating element, which accommodates a rubber-elastic reaction element and the output member abutting thereon in a radial direction, with the accommodating element being axially and radially supported on the control housing and being held in an axial direction by means of a holding element.

DE 39 04 641 A1 discloses a pneumatic brake booster of this type. In the prior art brake booster, a bowl-shaped accommodating element is provided to accommodate the reaction element and the output member, its bottom being axially supported on a frontal end of the control housing. In this arrangement, the reaction element in an axial direction partly bears against the accommodating element, partly against the control housing and partly against an input member. In accommodating elements of this type that accommodate reaction element and output member, the bowl-type configuration of the accommodating element with regard to the slot situation between accommodating element and control housing and between accommodating element and output member is disadvantageous, because the bowl-shaped accommodating element has two diameters, the dimensions of which must be adapted to the control housing, the reaction element and the output member. In order to take this fact into account, a precise and cost-intense manufacture of the accommodating element is required, or relatively large slots must be tolerated, which have negative effects on the lost travel of the brake booster and a slot extrusion of the reaction element, however. Further, the sophisticated assembly of the holding element, which additionally serves to guide the output member, is considered as needing improvement.

SUMMARY OF THE INVENTION

The invention relates to a generic brake booster, having a low-cost design, a simple assembly and, in addition, an insignificant slot extrusion of the reaction element and a lost travel of a small size.

According to an exemplary embodiment of the invention, the accommodating element is designed as a cylindrical sleeve, with the reaction element adjoining in an axial direction the head flange, on the one hand, and the control housing and the valve piston, on the other hand. The purpose of the sleeve is to prevent damages to the control housing, which may be due to transverse forces that act on the output member. The cylindrical shape of the sleeve can be manufactured in a simple and low-cost fashion. The fact that the reaction element bears against the sleeve only in a radial direction, while it bears against one side of the control housing in an axial direction allows improving the slot situation in such a fashion that the slot extrusion between sleeve and control housing is significantly reduced.

Further, the concentricity of the components is improved because the cylindrical sleeve has only one diameter that must be conformed to the control housing.

According to an exemplary embodiment of the invention, the sleeve includes a means to facilitate the assembly at its ends. This allows ease of mounting the sleeve into the control housing. Further, the mounting of reaction element and output member is facilitated. For example, the sleeve can have a chamfered design on an inside surface of its ends to this effect, or it includes a radially outwards directed collar at both its ends, or it includes a radially outwards directed collar at a first end facing away from the control housing and has a chamfered design on the inside surface of a second end facing the control housing.

The assembly is simplified in addition because the holding element is provided so as to be preloaded by a restoring spring of the brake booster, thereby obviating the need for an additional connection between holding element and e.g. control housing.

The holding element preferably has an essentially bowl-shaped design, with the output member projecting through the center of a bowl bottom of the holding element, and the holding element has on an inside surface a cylindrical extension that projects from the bowl bottom and is meant to guide the output member, while the restoring spring bears against a bowl edge at least in part. In a favorable embodiment, the holding element in the area of the bowl bottom includes radial arms to hold the sleeve in an axial direction.

A design of the holding element that is optimized in terms of weight and material is achieved in that the holding element is essentially shaped like a bowl of four webs, which converge at the bowl bottom and are interconnected at the bowl edge by means of a circumferential edge, with the radial arms being respectively provided between two steps. Advantageously, a reinforcing wall can be provided between two webs.

BRIEF DESCRIPTION OF THE DRAWINGS

Further features and advantages of the invention can be taken from the subsequent description of an embodiment for a pneumatic brake booster.

In the accompanying drawings.

DETAILED DESCRIPTION OF THE PREFERRED EMBODIMENTS

Figure 1:
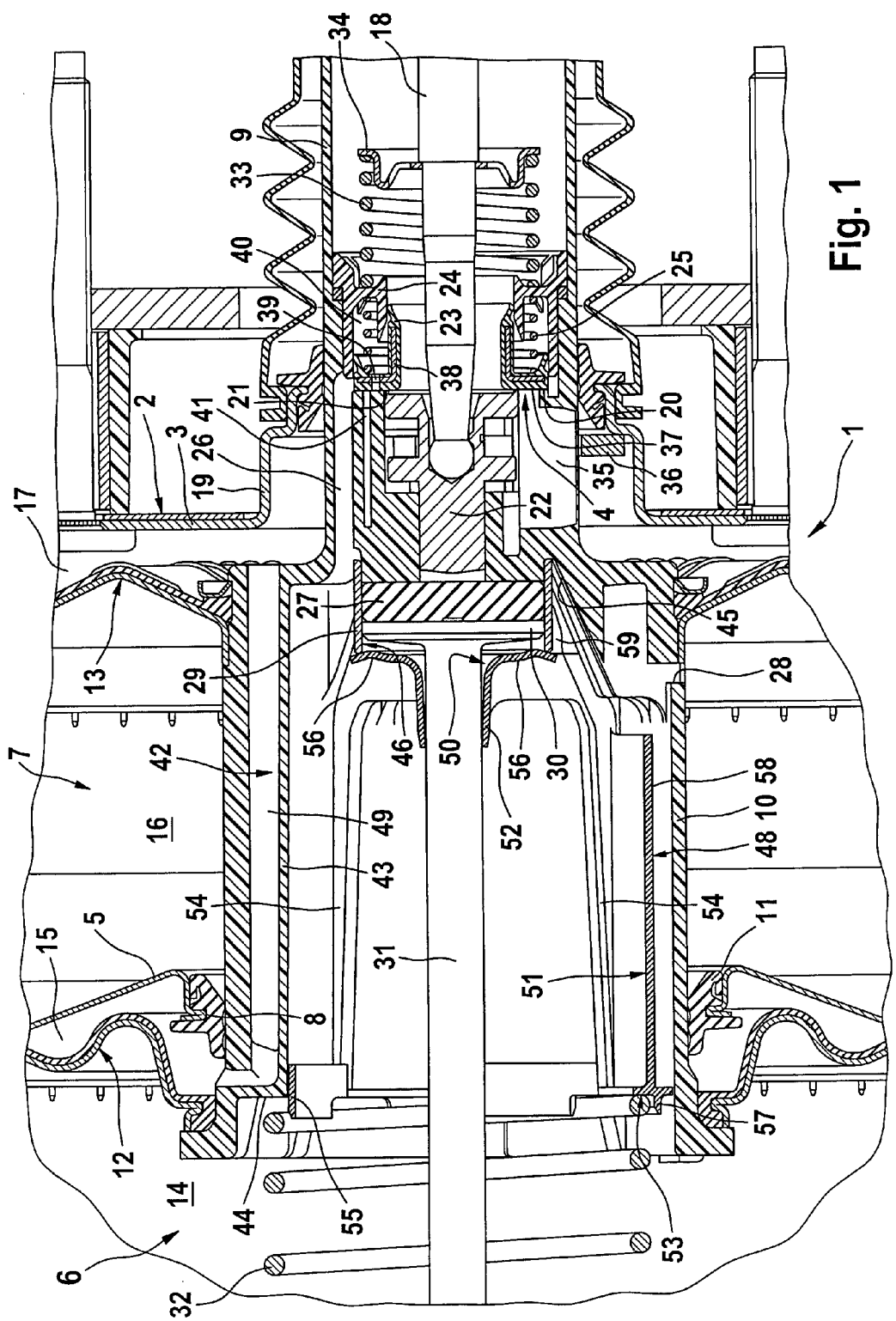
FIG. 1 shows a partial longitudinal cross-sectional view of a first embodiment of a brake booster of the invention.

FIG. 1 shows a longitudinal cross-sectional view of an embodiment of a tandem-type pneumatic brake booster 1 of the invention, comprising a booster housing 2 including a first housing shell 3 and a second housing shell (not shown) being preferably press fitted to each other by means of non-cutting shaping provisions. The interior of the booster housing 2 is subdivided by means of a roughly centrically arranged, stationary partition 5 into a first, front booster chamber 6 close to the master cylinder and a second, rear booster chamber 7 close to the brake pedal. The partition 5 includes a centrically arranged circular recess 8, which is penetrated by a control housing 9 or rather its cylindrical extension 10. The partition 5 is in sealing abutment on the extension 10 by means of a sealing element 11.

The first, front booster chamber 6 is subdivided by a first movable wall 12 into a first vacuum chamber 14 of constant pressure and into a first working chamber 15 of variable pressure, while the second, rear booster chamber 7 is subdivided by a second movable wall 13 into a second vacuum chamber 16 and a second working chamber 17. Usually, the second housing shell (not shown) is provided with a vacuum connection, by means of which the first vacuum chamber 14 can be connected to an appropriate vacuum source, e.g. a suction manifold of the motor vehicle engine, or to a vacuum pump.

The first housing shell 3 is provided with an axial portion 19 of small diameter in which the control housing 9 is axially movably guided in a sealed manner. Housed in the interior of the control housing 9 is a control valve 4, allowing a controlled ventilation of the two working chambers 15, 17, and thereby controlling the difference in pressure between the vacuum chambers 14, 16 and the working chambers 15, 17.

The control valve 4 is operable by an input member 18, which is connected to a brake pedal (not shown) and comprises a first sealing seat 20 designed on the control housing 9, a second sealing seat 21 that is designed on a valve piston 22 connected to the input member 18, and a valve member 23, which cooperates with both sealing seats 20, 21 and is urged against the valve seats 20, 21 by means of a valve spring 25 being supported on a guide element 24. The second working chamber 17 can be connected to the first vacuum chamber 14 by way of two bleeding ducts 26 that extend laterally in the control housing 9.

By way of a rubber-elastic reaction element 27 that abuts frontally on the control housing 9 and an output member 31 having a head flange 30, brake force is transmitted to an actuating piston of a master cylinder (not shown) of the motor vehicle brake system, which is mounted at the vacuum-side end of the brake booster 1. The input force introduced at the input member 18 is transmitted to the reaction element 27 by means of the valve piston 22.

A restoring spring 32, which is supported on the vacuum-side end wall of the booster housing 2, maintains the movable walls 12, 13 in the initial position shown. In addition, a return spring 33 is provided, which is arranged between a holding element 34 arranged at the input member 18 and the guide element 24 of the control valve 4, and the force of which produces a bias of the valve piston 22 or its valve seat 21 relative to the valve member 23.

In order to connect the second working chamber 17 to the atmosphere when the control valve 20 is operated, two ventilating ducts 35 are provided in the control housing 9, which extend in an axial direction roughly over the length of the bleeding ducts 26. This allows considerably increasing the flow cross-section of the ventilating ducts 35 and improving the air flow in addition, because the axial distance between the ventilating ducts 35 and the flow-critical area of the sealing seats 20, 21 of the control valve 4 is optimally shortened. The response dynamics of the brake booster 1 is thereby optimized.

The return movement of the valve piston 22 at the end of a brake operation is delimited by a transverse member 36, which can be introduced in a radial direction into the control housing 9 and bears against the booster housing 2 in the release position of the brake booster as shown in the drawing.

The valve member 23 includes an annular sealing surface 37, which cooperates with the two sealing seats 20, 21, which is reinforced by a metallic, L-shaped reinforcing element 38 and includes several axial passages 39.

A pneumatic chamber 40 is delimited in the control housing 9. The flow ducts (not referred to in detail) being provided by the passages 39 connect the pneumatic chamber 40 to an annular chamber 41 that is delimited by the sealing seats 20, 21 and into which the above-mentioned ventilating ducts 35 open so that the pneumatic chamber 40, which is arranged on the side of the valve member 23 remote from the sealing surface 37, is in constant communication with the second working chamber 17, and pressure balance takes place at the valve member 23.

The connection between the first and the second vacuum chambers 14, 16 is constituted by one or more apertures 28 in the extension 10 of the control housing 9, which are provided in the area between the partition 5 and the second movable wall 13.

Further, one or more substantially axially aligned connecting channels 42 are provided in the extension 10 of the control housing 9, interconnecting the first and the second vacuum chambers 14, 16. Preferably two connecting channels 42 are provided, which extend in an axial direction from the second working chamber 17 to the first working chamber 15 and open radially into the first working chamber 15. As this occurs, a connecting channel 42 is formed in each case by axial side walls 43, 49 and a radial side wall 44. As FIG. 1 shows the brake booster 1 in a longitudinal cross-section through two planes, the second connecting channel 42 is not visible. However, the brake booster 1 has a symmetrical design so that the two ventilating and bleeding ducts 35, 26 and the two connecting channels 45 are arranged diametrically opposite each other distributed on the periphery of the control housing 9.

The reaction element 27 and the head flange 30 of the output member 31 are arranged in an accommodating element configured as cylindrical sleeve 29, serving to avoid damages of the control housing 9 due to transverse forces that can act on the output member. As is apparent from FIG. 1, the sleeve 29 is arranged in a recess 45 of the control housing 9, whereby it is axially and radially supported on the control housing 9. Further, it can be seen in FIG. 1 that the reaction element 27 adjoins in an axial direction the head flange 30, on the one hand, and the control housing 9 and the valve piston 22, on the other hand. The reaction element 27 is adjacent to the sleeve 29 in a radial direction.

Due to its cylindrical shape, the sleeve 29 can be manufactured in a simple and low-cost manner, on the one hand, while the sleeve 29 has only one inside diameter (not numbered), on the other hand, which must be adapted to the recess 45 of the control housing 9. The result is that the slot situation between sleeve 29 and control housing 9 and between sleeve 29 and output member 31 is significantly improved, i.e. the slots can be considerably reduced in size compared to the prior art brake boosters. This achieves advantages due to a minimized slot extrusion of the reaction element 27 and due to a shortened lost travel of the brake booster 1. An additional result is the better concentricity of the component.

The lost travel is further improved in that the reaction element 27 has edges with a very small radius, i.e. so-to-speak almost sharp edges, whereby no free spaces are produced in the area of the reaction element 27, into which it can be urged when subjected to load, and reaction force is not applied to the input member 18 or the valve piston 22, respectively.

The sleeve 29 has a chamfered design on an inside surface 46 of its ends, the assembly of the sleeve 29 in the control housing 9, yet also the assembly of the reaction element 27 and the output member 31 into the sleeve 27 being facilitated as a result.

Figure 3:
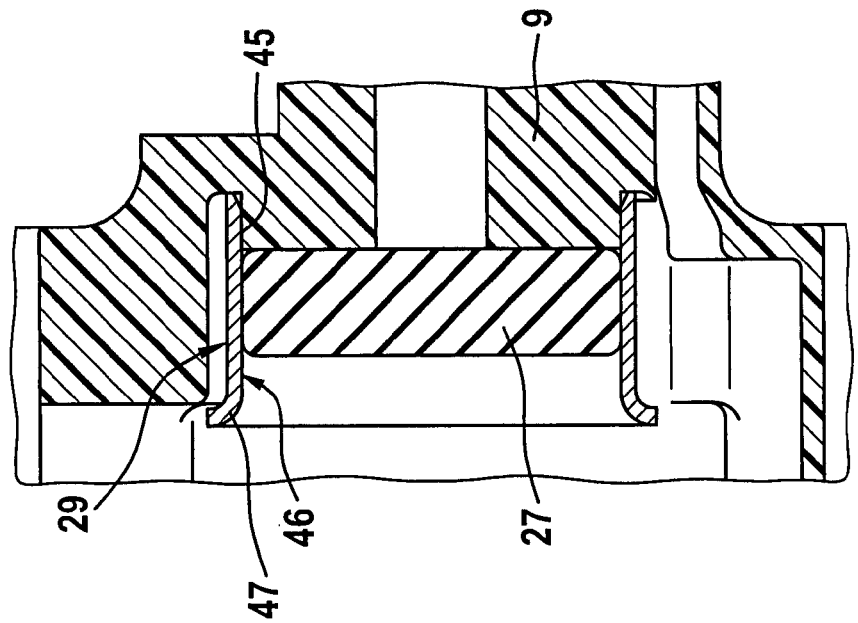
FIG. 3 shows a longitudinal cross-sectional view of a cut-out of a third embodiment of a brake booster of the invention.
Figure 2:
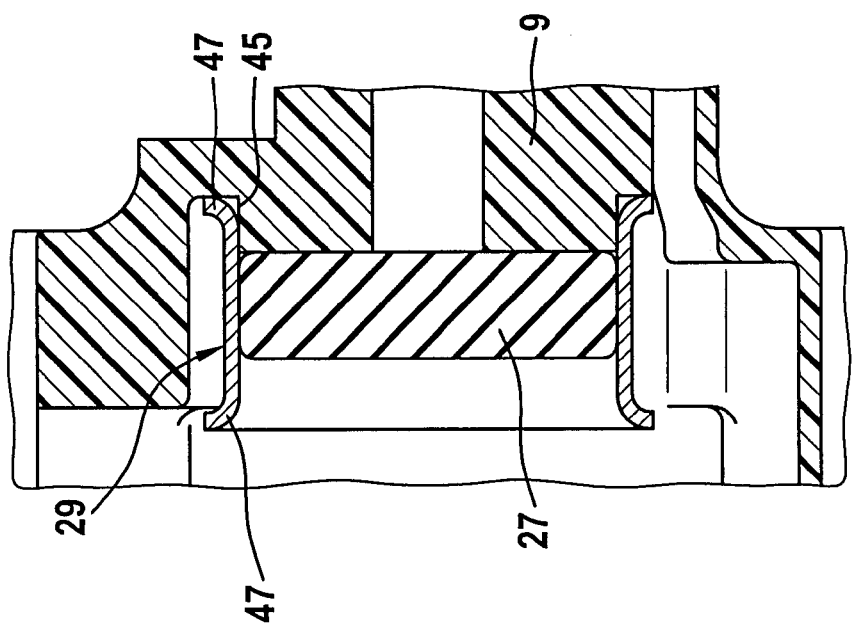
FIG. 2 shows a longitudinal cross-sectional view of a cut-out of a second embodiment of a brake booster of the invention.

FIGS. 2 and 3 show in each case a longitudinal cross-sectional view of a cutout of a second and a third embodiment of a brake booster 1 of the invention, which differ from the first embodiment only as regards the design of the sleeves 29.

As can be seen in FIG. 2, the sleeve 29 of the second embodiment includes at its ends a radially outwards extending collar 47 in order to facilitate the assembly. In contrast thereto, FIG. 3 shows the sleeve 29 with a first end facing away from the control housing 9, which end includes a radially outwards oriented collar 47, and with a second end facing the control housing 9 and having a chamfered design on the inside surface 46.

In all three embodiments described, the sleeve 29 is positioned in an axial direction in the recess 45 in such a manner that an abutment of the reaction element 27 without free spaces that have negative effects on the lost travel is ensured. For example, the sleeve 29 according to FIG. 2 is positioned in an axial direction in such a way that the rounded area of the collar 47 is disposed outside the area of the reaction element 27.

Figure 4:
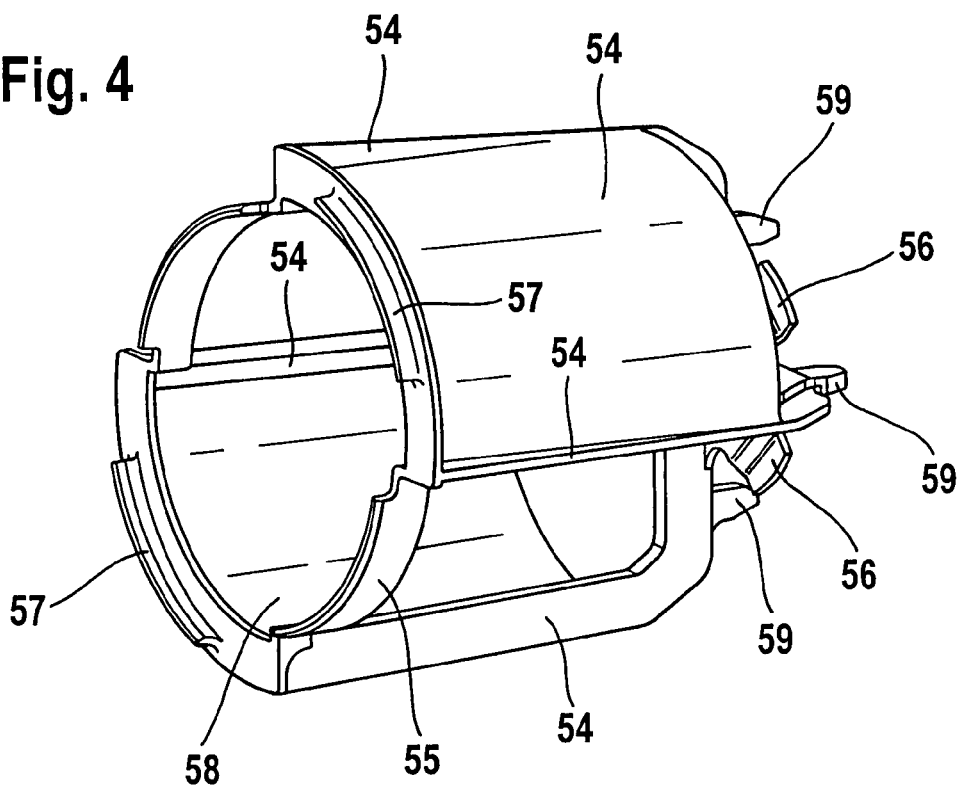
FIG. 4 is a perspective view of a holding element of the first embodiment with reinforcing walls.
Figure 5:
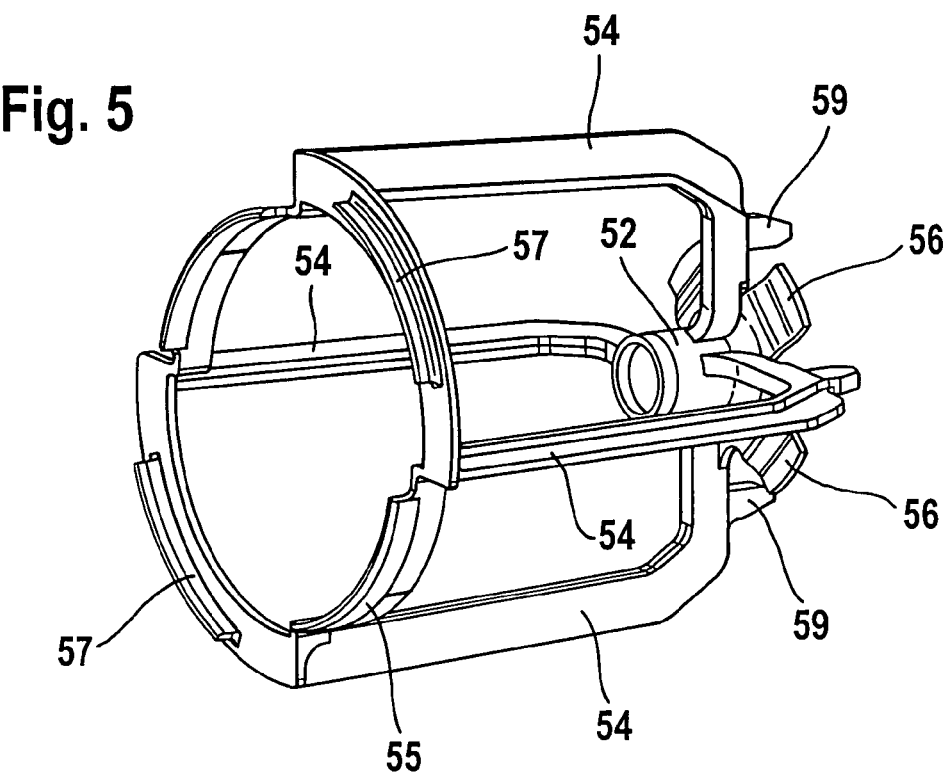
FIG. 5 is a perspective view of a holding element without reinforcing walls.

It can be seen in FIG. 1 that the sleeve 29 is held in an axial direction by means of a holding element 48, which is shown in a perspective view in FIG. 4 or FIG. 5, respectively. The holding elements 48 according to FIGS. 4 and 5 differ from each other only in that the holding element 48 illustrated in FIGS. 1 and 4 includes additional reinforcing elements.

The holding element 48 has a substantially bowl-shaped design and is biased by the restoring spring 32 in the direction of the reaction element 27, with the output member 31 extending through the center of a bowl bottom 50 of the holding element 48. On an inside surface 51 of the holding element 48, there is provided a cylindrical extension 52, which projects from the bowl bottom 50 and is intended to guide the output member 31, and the restoring spring 32 bears against a bowl edge 53 at least in part. An additional element to connect the holding element 48 to the control housing 9 is not necessary due to the spring bias of the restoring spring 32, whereby an additional fastening effort can be avoided.

As can be taken from FIG. 4 and FIG. 5 in particular, the holding element 48 is composed of four webs 54 basically, which converge at the bowl bottom 50 and are interconnected at the bowl edge 53 by means of a circumferential edge 55. In the area of the bowl bottom 50, the holding element 48 has radial arms 56 used to hold the sleeve 29 in an axial direction. In this arrangement, the arms 56 are respectively arranged between two webs 54.

The restoring spring 32 is positioned by axial projections 57 of the bowl edge 53, in the area in which the restoring spring 32 bears against the bowl edge 53.

To reinforce the holding element 48, axially aligned reinforcing walls 58 can be provided in each case between two webs 54, as can be taken from FIGS. 1 and 4.

Further, axial projections 59 are arranged at the webs 54 in the area of the bowl bottom 50, positioning the holding element 48 in the recess 45 of the control housing 9 and at the sleeve 29.

The brake booster 1 of the invention is shown in tandem-type design. However, the invention is principally suitable for use in all pneumatic brake boosters in tandem-type and single-type design.

The invention claimed is:

1. A pneumatic brake booster comprising:
a booster housing, which is subdivided into at least two chambers by at least one axially movable wall to which a pneumatic differential pressure can be applied,
a control valve controlling the differential pressure and being arranged in a control housing,
an operable input member, which is connected to a valve piston,
an output member which applies a boosting force to a master cylinder,
as well as an accommodating element, which accommodates a rubber-elastic reaction element and the output member abutting thereon in a radial direction, with the accommodating element being axially and radially supported on the control housing and being held in an axial direction by a holding element,
wherein the accommodating element is designed as a cylindrical sleeve, with the reaction element adjoining in an axial direction a head flange of the output member, on the one hand, and the control housing and the valve piston, on the other hand.

2. The pneumatic brake booster as claimed in claim 1, wherein the sleeve includes a means to facilitate the assembly at its ends.

3. The pneumatic brake booster as claimed in claim 2, wherein the sleeve has a chamfered design on an inside surface of its ends.

4. The pneumatic brake booster as claimed in claim 2, wherein the sleeve at its ends has a radially outwards directed collar.

5. The pneumatic brake booster as claimed in claim 2, wherein the sleeve at a first end facing away from the control housing includes a radially outwards directed collar and has a chamfered design on an inside surface of a second end facing the control housing.

6. The pneumatic brake booster as claimed in claim 1, wherein the holding element is preloaded by a restoring spring of the brake booster.

7. The pneumatic brake booster as claimed in claim 6, wherein the holding element has a substantially bowl-shaped design, with the output member projecting through the center of a bowl bottom of the holding element, and the holding element has on an inside surface a cylindrical extension that projects from the bowl bottom and is configured to guide the output member, while the restoring spring bears against a bowl edge at least in part.

8. The pneumatic brake booster as claimed in claim 7, wherein the holding element, in the area of the bowl bottom, includes radial arms to hold the sleeve in an axial direction.

9. The pneumatic brake booster as claimed in claim 8, wherein the holding element is substantially shaped like a bowl made of four webs, which converge at the bowl bottom and are interconnected at the bowl edge by a circumferential edge, with the radial arms being respectively arranged between two steps.

10. The pneumatic brake booster as claimed in claim 9, wherein a reinforcing wall is provided between two webs.

* * * * *